(12) United States Patent
Mezaki et al.

(10) Patent No.: US 9,759,176 B2
(45) Date of Patent: Sep. 12, 2017

(54) ENGINE AND ENGINE-OPERATED WORKING MACHINE

(75) Inventors: Akira Mezaki, Ibaraki (JP); Shigetoshi Ishida, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 878 days.

(21) Appl. No.: 14/239,482

(22) PCT Filed: Aug. 14, 2012

(86) PCT No.: PCT/JP2012/070946
§ 371 (c)(1),
(2), (4) Date: Feb. 18, 2014

(87) PCT Pub. No.: WO2013/027689
PCT Pub. Date: Feb. 28, 2013

(65) Prior Publication Data
US 2014/0230787 A1    Aug. 21, 2014

(30) Foreign Application Priority Data

Aug. 19, 2011   (JP) ................................. 2011-179903

(51) Int. Cl.
*F02P 5/02* (2006.01)
*B27B 17/08* (2006.01)
(Continued)

(52) U.S. Cl.
CPC .............. *F02P 5/02* (2013.01); *B27B 17/083* (2013.01); *F02P 5/1506* (2013.01);
(Continued)

(58) Field of Classification Search
CPC ....... F02P 5/1506; F02P 5/02; F02D 35/0053; B27B 17/083
(Continued)

(56) References Cited

U.S. PATENT DOCUMENTS 4,336,778 A * 6/1982 Howard ................. B60K 28/00
                                                      123/198 D
4,610,231 A * 9/1986 Nakata .................. F02P 5/1558
                                                      123/406.53
(Continued)

FOREIGN PATENT DOCUMENTS

CN          1789687 A     6/2006
EP       2 213 870 A2     8/2010
(Continued)

OTHER PUBLICATIONS

Japanese Office Action for the related Japanese Patent Application No. 2011-179903 dated Apr. 17, 2015.
(Continued)

*Primary Examiner* — Mahmoud Gimie
(74) *Attorney, Agent, or Firm* — Kenealy Vaidya LLP (57) ABSTRACT

An engine is configured such that, during the starting of the engine, when it is being detected that throttle opening has been set at a starting position, if it is detected that the engine speed has exceeded a predetermined speed slightly lower than a speed when a centrifugal clutch becomes an engaged state, a control unit retards the ignition timing from a general angle to a first angle BTDC, and then advances the ignition timing to a second angle at predetermined intervals, and holds the ignition timing at the second angle for a predetermined time period, thereby preventing the engine from stopping due to fouling on the spark plug while suppressing the engine speed at the speed when the centrifugal clutch becomes the engaged state, or less.

8 Claims, 6 Drawing Sheets

(51) Int. Cl.
*F02P 5/15* (2006.01)
*F02N 1/00* (2006.01)
*F02N 3/02* (2006.01)
*F02P 11/00* (2006.01)
*F02D 35/00* (2006.01)

(52) U.S. Cl.
CPC .. *F02D 35/0053* (2013.01); *F02D 2200/0404* (2013.01); *F02D 2200/101* (2013.01); *F02D 2400/04* (2013.01); *F02D 2400/06* (2013.01); *F02N 1/005* (2013.01); *F02N 3/02* (2013.01); *F02N 2250/06* (2013.01); *F02P 11/00* (2013.01); *Y02T 10/46* (2013.01)

(58) Field of Classification Search
USPC ............ 123/406.52, 406.54, 406.53, 406.59
See application file for complete search history.

(56) References Cited

U.S. PATENT DOCUMENTS

| | | | | |
|---|---|---|---|---|
| 5,020,497 A | * | 6/1991 | Umehara | ............... F02P 5/1504 123/406.52 |
| 7,699,039 B2 | * | 4/2010 | Carlsson | .................. F02P 11/00 123/334 |
| 7,735,471 B2 | * | 6/2010 | Andersson | ................ F02P 3/06 123/406.54 |
| 2006/0102125 A1 | | 5/2006 | Mashiki | |
| 2008/0163851 A1 | | 7/2008 | Kolossow | |
| 2009/0326777 A1 | | 12/2009 | Oshima et al. | |

FOREIGN PATENT DOCUMENTS

| | | |
|---|---|---|
| JP | 1-240772 A | 9/1989 |
| JP | 5-50077 U | 7/1993 |
| JP | 10-52801 A | 2/1998 |
| JP | 2001-304084 A | 10/2001 |
| JP | 2004-116451 A | 4/2004 |
| JP | 2007-154832 A | 6/2007 |
| JP | 2009-138673 A | 6/2009 |
| JP | 2010-31850 A | 2/2010 |

OTHER PUBLICATIONS

International Search Report and Written Opinion of the International Search Report for PCT/JP2012/070946 dated Jan. 30, 2013.
Chinese Office Action for the related Chinese Patent Application No. 201280040433.9 dated Sep. 1, 2015.

* cited by examiner

ENGINE AND ENGINE-OPERATED WORKING MACHINE

This application is a U.S. national phase filing under 35 U.S.C. §371 of PCT Application No. PCT/JP2012/070946, filed Aug. 14, 2012, and which in turn claims priority under 35 U.S.C. §119 to Japanese Patent Application No. 2011-179903 filed Aug. 19, 2011, the entireties of which are incorporated by reference herein.

TECHNICAL FIELD

The present invention relates to an engine and an engine-operated working machine such as a cutter, a chainsaw, or a bush cutter which uses the engine as a power source to drive an edge tool.

BACKGROUND ART

Small engines, particularly, two-stroke engines have been widely used as power sources in small working machines such as cutters, chainsaws, and bush cutters. The two-stroke engines are small and light and can obtain high power output. Therefore, the two-stroke engines can work for a long time by fuel feeding. As one of methods of improving the startability of those engines, there is known a method of opening a throttle valve of a carburetor from an almost fully closed position (hereinafter, referred to as an idle position) by a predetermined amount, thereby increasing an amount of intake air during starting.

In a case of using this method, for example, if the throttle valve is fully opened for starting, the startability of a corresponding engine is improved, but immediately after the starting, the engine speed suddenly increases. Thus, a centrifugal clutch may be engaged such that a front tool such as a rotary blade rotates. In order to prevent this phenomenon, it may be considered to start the engine by slightly opening the throttle valve. However, in this case, since a throttle opening is low, the startability may be reduced. For this reason, as one of methods of preventing revolutions of an edge tool, a brake mechanism for forcibly stopping revolutions of the edge tool during engine starting is provided to, for example, a chainsaw, such that, even if the engine speed increases during the starting, a brake acts to prevent revolutions of the edge tool. However, when the brake is operated, a centrifugal clutch and a clutch housing slide on each other. If this state continues for a long time, the centrifugal clutch generates heat, which causes the clutch housing to wear.

As a technology for controlling the speed of an engine to a predetermined value or less, PTL 1 discloses a technology which, if the speed of an engine is a predetermined speed or more, delays the timing of ignition such that the speed of the engine is maintained at a predetermined value (corresponding to, for example, a bottom dead center), whereby the speed of the engine is controlled.

CITATION LIST

Patent Literature

PTL 1: JP-UM-A-5-50077

SUMMARY OF INVENTION

Technical Problem

However, in the above-described related-art technology disclosed in PTL 1, in a case where it is necessary to operate a throttle trigger or to release a brake to release the control on the timing of ignition during starting, unless a worker performs the operation corresponding to the release of the control on the timing of ignition, the retardation state of the ignition timing continues. If extreme retardation of the ignition timing continues, a spark plug may be fouled due to unburned gas, and thus the engine may stop.

The present invention has been made in view of the above-described background, and one object of the present invention is to provide an engine and an engine-operated working machine capable of suppressing an increase in the engine speed during starting while improving startability.

Another object of the present invention is to provide an engine and an engine-operated working machine capable of suppressing an increase in the speed while slightly opening a throttle during starting, and capable of preventing the engine from stopping due to fouling on a spark plug.

A still another object of the present invention is to provide an engine and an engine-operated working machine capable of preventing an increase in the engine speed during starting from burdening a brake mechanism or a centrifugal clutch.

Solution to Problem

Illustrative aspects of the present invention will be described as follows.

According to a first illustrative aspect of the invention, there is provided an engine comprising: a cylinder; a carburetor configured to supply an air-fuel mixture into the cylinder and includes a throttle valve; and an ignition device configured to ignite the air-fuel mixture in the cylinder, wherein: the engine comprises: an engine-speed detecting unit configured to detect the speed of the engine; a throttle-opening detecting unit configured to detect the throttle opening of the carburetor; and a control unit configured to control the ignition timing of the ignition device; and during starting of the engine, if the throttle-opening detecting unit detects that the throttle opening is at a predetermined position and the engine has exceeded a predetermined speed, the control unit performs control such that: the ignition timing is retarded from a general angle to a first angle; and the retarded ignition timing is intermittently advanced from the first angle to a second angle.

Here, being intermittent means not being continuous. For example, the timing of ignition is advanced to the second angle at predetermined time intervals, in intervals of a predetermined number of cycles or at variable time intervals, and then the timing of ignition returns to the first angle.

According to a second illustrative aspect of the invention, a retardation amount of the second angle from the general angle is smaller than a retardation amount of the first angle from the general angle. According to a third illustrative aspect of the invention, the engine further comprises a centrifugal clutch, wherein the predetermined speed is lower than a speed when the centrifugal clutch becomes an engaged state. According to a fourth illustrative aspect of the invention, in a case where holding of the throttle opening at the predetermined position is released, the control unit releases the ignition timing control using the first and second angles. According to a fifth illustrative aspect of the invention, during the ignition timing control by the control unit, if the engine-speed detecting unit detects that the speed is lower than the predetermined speed, the ignition timing control using the first and second angles is released.

According to a sixth illustrative aspect of the invention, a time period when the ignition timing is advanced to the second angle and is maintained at the second angle is a time period when the engine speed decreases by the retardation to the first angle. According to a seventh illustrative aspect of the invention, the engine further comprises a stopper configured to fix a throttle trigger such that the throttle opening can be maintained at the predetermined position. According to an eighth illustrative aspect of the invention, the throttle-opening detecting unit is a switch configured to detect whether the stopper has been operated. According to a ninth illustrative aspect of the invention, there is provided an engine-operated working machine comprising the engine according to any one of the above illustrative aspects.

Advantageous Effects of Invention

According to the first illustrative aspect, during the starting of the engine, if the throttle-opening detecting unit detects that the throttle opening is at the predetermined position and the engine has exceeded the predetermined speed, the control unit retards the ignition timing from the general angle to the first angle, and then conclusively advances the retarded ignition timing from the first angle to the second angle. Therefore, it is possible to improve the startability, and to prevent the engine from stopping due to fouling on the spark plug while suppressing an increase in the engine speed during the starting.

According to the second illustrative aspect, since the retardation amount of the ignition timing to the second angle is smaller than the retardation amount of the ignition timing to the first angle, the retarded ignition timing returns to a good state at the predetermined intervals. Therefore, normal combustion is performed at the predetermined intervals, such that the inside of the engine can be maintained in a good state.

According to the third illustrative aspect, since the predetermined speed is lower than the speed when the centrifugal clutch is in the engaged state, it is possible to prevent the centrifugal clutch from being engaged during warm-up after the starting.

According to the fourth illustrative aspect, in the case where holding of the throttle opening at the predetermined position is released, the control unit releases the ignition timing control using the first and second angles. Therefore, after the warm-up is completed, the engine can automatically return to a general ignition timing control.

According to the fifth illustrative aspect, during the ignition timing control of the control unit, if the engine-speed detecting unit detects that the speed is lower than the predetermined speed, the ignition timing control using the first and second angles is released. Therefore, it is possible to prevent retardation control on the ignition timing from being performed in an unnecessary revolution area, and to maintain the good combustion state of the engine.

According to the sixth illustrative aspect, the time period when the retarded ignition timing is advanced from the first angle to the second angle may be the time period when the engine speed decreases down by the retardation to the first angle. Therefore, it is possible to prevent the engine speed from excessively decreasing due to the ignition timing of the first angle, and to perform efficient warm-up.

According to the seventh illustrative aspect, since the engine further includes the stopper that fixes the throttle trigger such that the throttle opening can be maintained at the predetermined position, it is possible to maintain the optimal throttle opening during the starting, and to implement an engine having good startability.

According to the eighth illustrative aspect, since the throttle-operation detecting unit is a switch that detects whether the stopper has been operated, it is possible to surely detect the starting or war-up state.

According to the ninth illustrative aspect, it is possible to implement an engine-operated working machine capable of improving the startability and capable of preventing the engine from stopping due to fouling on the spark plug while suppressing an increase in the engine speed during the starting.

The above and other objects and new features of the present invention will become apparent from the following description of this specification and the drawings.

DESCRIPTION OF EMBODIMENTS

First Embodiment

Hereinafter, embodiments of the present invention will be described with reference to the accompanying drawings. Throughout the drawings, identical portions are denoted by the same reference symbols, and the repeated description thereof will be omitted. In this specification, a front side, a rear side, an upper side, and a lower side will be described with reference to directions shown in the drawings.

Figure 1:
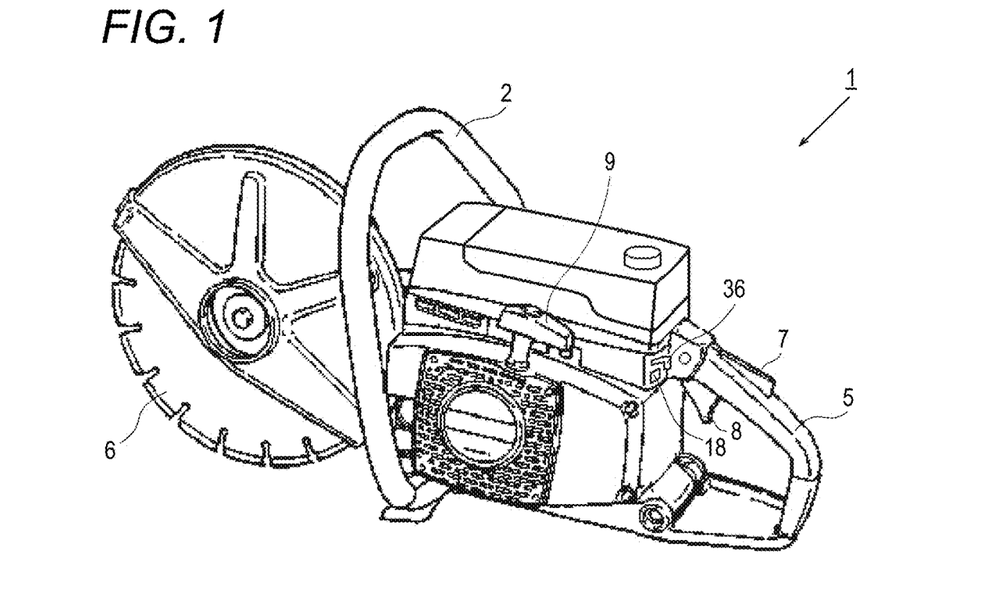
FIG. 1 is a perspective view illustrating an engine-operated working machine according to an embodiment of the present invention.

FIG. 1 is a perspective view illustrating an engine-operated working machine according to an embodiment of the present invention. A cutter 1 is an engine-operated working machine which includes a two-stroke engine (which will be described later) and revolves a front tool, that is, a rotary blade 6 by the power of the engine. A worker may hold a front handle 2 with the left hand and hold a rear handle 5 with the right hand. Then, the worker can operate a throttle trigger 8 while holding a locking lever 7 disposed at the rear handle 5, thereby adjusting the speed of the engine. In the vicinity of a front base of the rear handle 5, a choke knob 36 and an engine stop switch 18 are provided.

Figure 2:
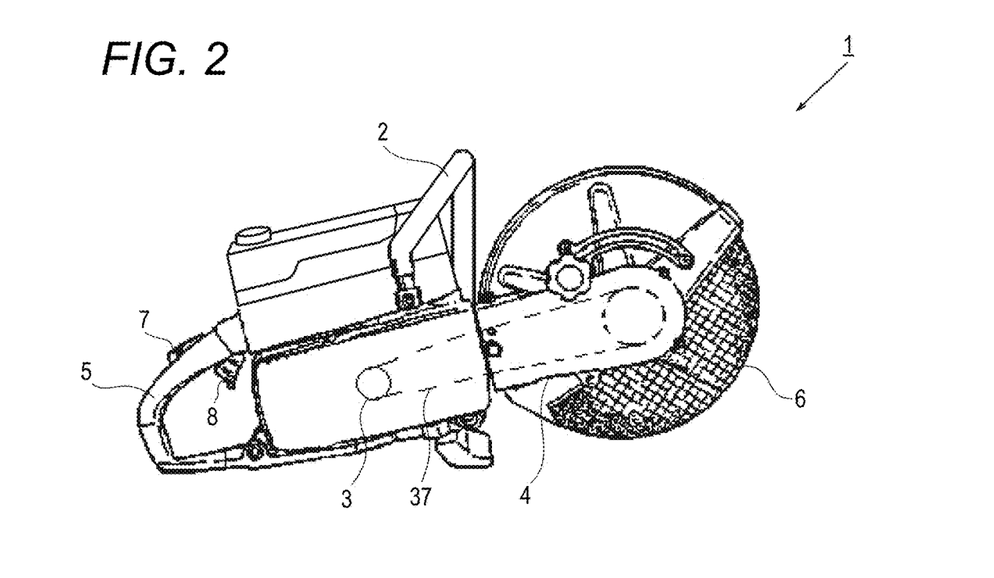
FIG. 2 is a perspective view illustrating the cutter according to the embodiment of the present invention as seen from the right side.

FIG. 2 is a perspective view illustrating the cutter according to the embodiment of the present invention as seen from the right side. A centrifugal clutch 3 is connected to an output shaft of the engine (not shown). If the speed of the engine becomes equal to or more than a predetermined value, for example, 4300 rpm, the centrifugal clutch 3 becomes an engaged state such that the power of the engine is transmitted to a belt 37 provided in an arm 4. As a result, the rotary blade 6 provided at the tip of the arm 4 revolves.

Figure 3:
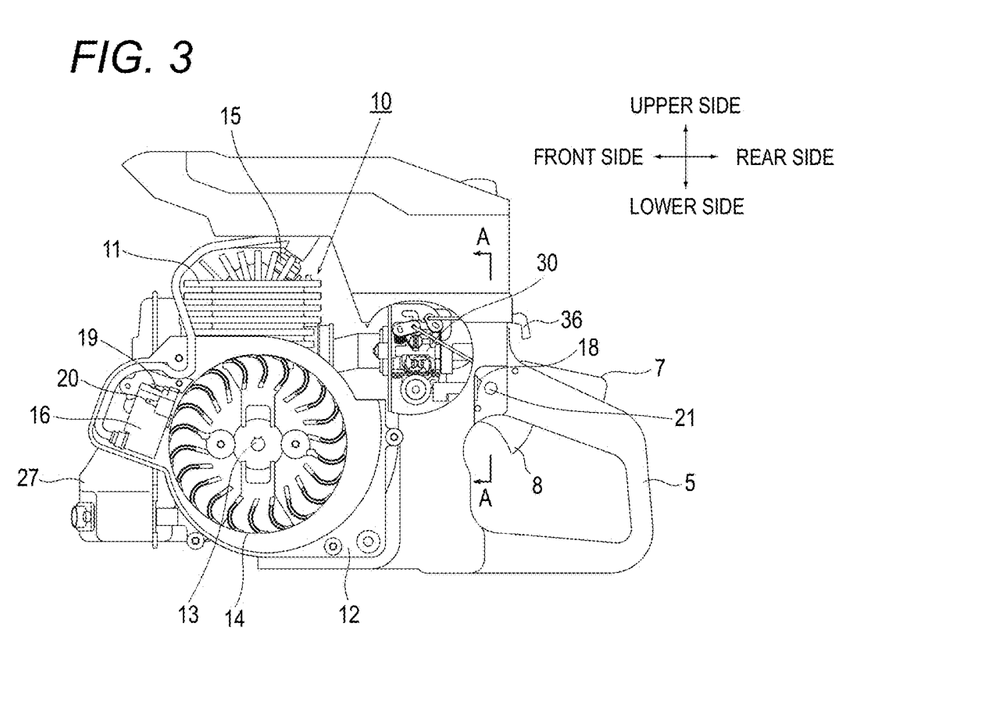
FIG. 3 is a partial cross-sectional view illustrating the cutter with an engine according to the embodiment of the present invention.

FIG. 3 is a partial cross-sectional view illustrating the cutter 1 with an engine 10 mounted therein according to the embodiment of the present invention. The engine 10 is held by a housing 12. The engine 10 includes a carburetor 30 for supplying an air-fuel mixture into a cylinder 11, a muffler 27 for exhausting a combustion gas from the engine 10 to an outside, a magnet rotor 14 fixed to a crankshaft 13, an ignition coil 16 disposed along the outer circumference of the magnet rotor 14, and a spark plug 15 (one example of an ignition device) connected to the ignition coil 16. The ignition coil 16 includes a first terminal 19 configured to be connected to the stop switch 18 to shut off supply of a high-voltage current to the spark plug 15, and a second terminal 20 configured to be connected to a throttle-position detecting switch 26 which is a throttle-opening detecting unit. In the vicinity of the stop switch 18, a stopper 21 for maintaining the throttle trigger 8 at a half pulled state to start the engine 10 is provided.

Figure 4:
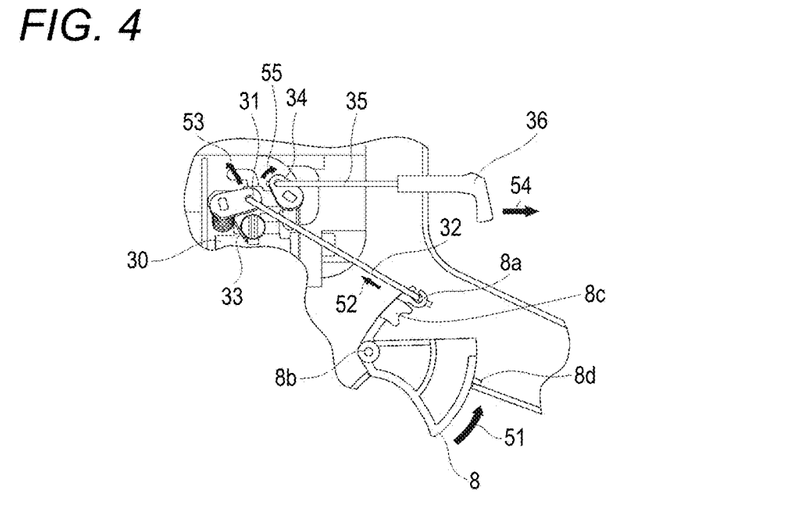
FIG. 4 is a partial enlarged view illustrating a throttle portion in which a throttle trigger of FIG. 3 is at an idle position.

FIG. 4 is a partial enlarged view illustrating the throttle mechanism portion when the throttle trigger 8 of FIG. 3 is at an idle position. The carburetor 30 includes a throttle valve (not shown) inside an intake air passage (not shown), a throttle lever 31 for opening and closing the throttle valve, and a choke lever 34. The throttle lever 31 cooperates with the throttle trigger 8, which is manipulable by the worker, through a throttle operating rod 32. The throttle trigger 8 is rotatable on a rotary shaft 8*b* by a predetermined angle. When the worker holds the throttle trigger 8, the throttle trigger 8 moves in the direction of an arrow 51, and a movable arm 8*a* connected to the throttle trigger 8 moves the throttle operating rod 32 in the direction of an arrow 52. As a result, the throttle lever 31 swings in the direction of an arrow 53. When the worker opens the throttle trigger 8, the throttle lever 31 moves in the opposite direction to the arrow 53 by a torsion spring 33 and the throttle trigger 8 returns in the opposite direction to the arrow 51, so that the speed of the engine 10 is reduced to an idling speed. In this way, the worker can operate the throttle trigger 8 to open or close the throttle valve, thereby adjusting the power output of the engine 10. In the state of FIG. 4, the stopper 8*d* for the throttle trigger 8 is in contact with the edge portion of an opening 5*a* of the rear handle 5, so as not to further return the throttle trigger 8.

The carburetor 30 includes the choke lever 34. The choke lever 34 is to operate a throttling unit (not shown) for regulating the amount of intake air. The choke lever 34 is connected to a choke operating rod 35, and the choke knob 36 is provided at the tip of the choke operating rod 35. For the starting of the engine, the worker pulls the choke knob 36 in the direction of an arrow 54. Then, the choke lever 34 moves in the direction of an arrow 55, so as to generate a negative pressure while throttle the amount of intake air in the carburetor. As a result, the fuel is forcibly sucked out, and thus, the air-fuel mixture is thickened.

Figure 5:
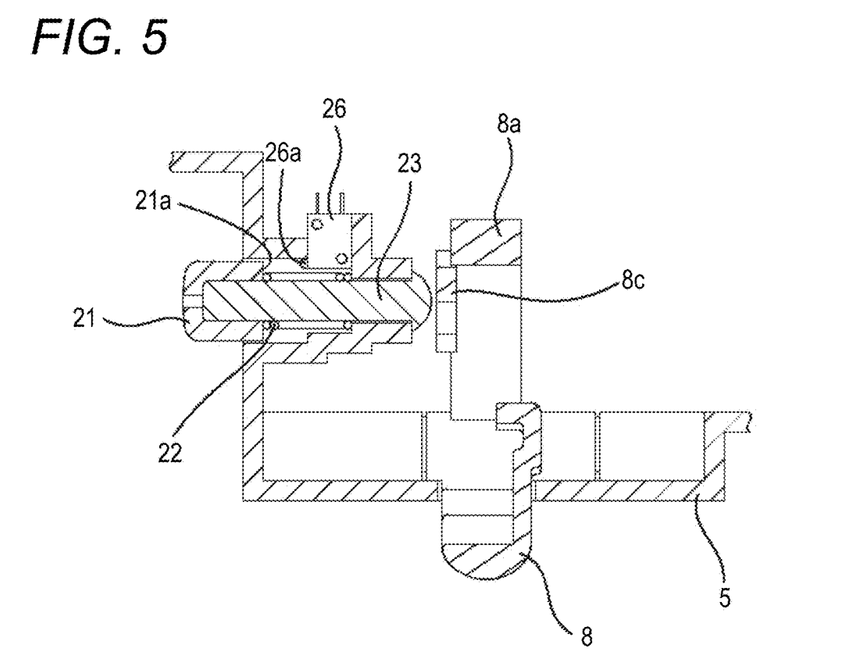
FIG. 5 is a partial cross-sectional view taken along a line A-A of FIG. 3 and shows the throttle trigger and a stopper when the throttle trigger is at the idle position.

FIG. 5 is a partial cross-sectional view taken along a line A-A of FIG. 3 and shows the throttle trigger 8 and the stopper 21 when the throttle trigger 8 is at the idle position. Inside the rear handle 5, in the vicinity of the stopper 21, the throttle-position detecting switch (throttle-operation detecting unit) 26 is provided. When the stopper 21 is in a pushed state, that is, when the throttle trigger 8 is held at a starting position (the state of FIG. 7, which will be described later), the throttle-position detecting switch 26 is ON. When the throttle trigger 8 is not held at the starting position (the state of FIG. 5), the throttle-position detecting switch 26 is OFF. In a portion of the throttle-position detecting switch 26, a plunger 26*a*, which is turned on or off by being pushed, is provided. The plunger 26*a* is provided at a position facing a tip portion 21*a* of the stopper 21.

Figure 6:
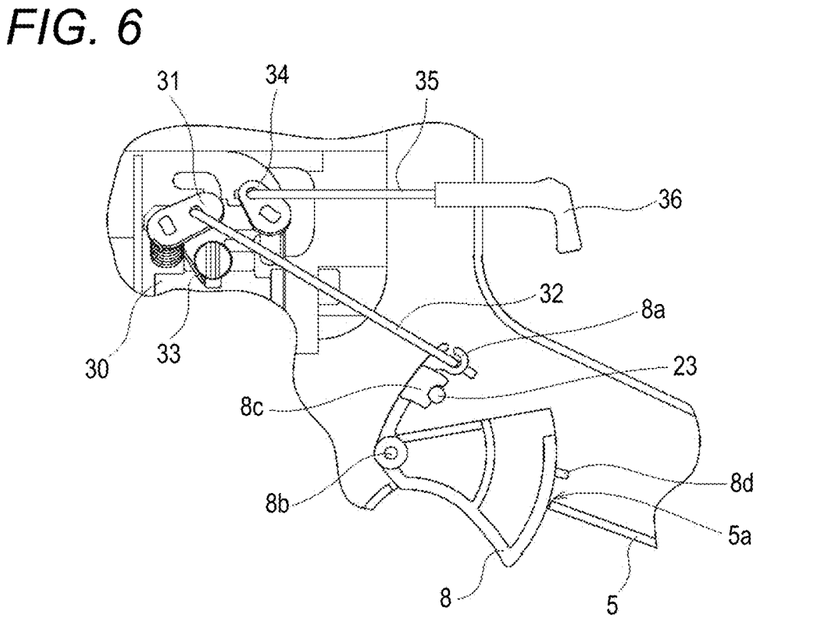
FIG. 6 is a partial enlarged view illustrating a throttle mechanism portion when the throttle trigger of FIG. 3 is at a starting position.

FIG. 6 is a partial enlarged view illustrating a throttle mechanism portion when the throttle trigger 8 of FIG. 3 is at the starting position. Here, the starting position means a state in which the throttle valve is open further than the idle position, and is a position between a half-throttled position and a fully open position. A fixing position of the throttle valve is set such that the fixing position is optimal for warming up the engine 10 and a speed sufficiently higher than the idling speed is obtained. The rear handle 5 includes the stopper 21 for holding the throttle trigger 8 at the starting position, that is, for holding the throttle valve at the starting position. The movable arm 8*a* includes a locking plate 8*c* for locking a plunger 23 of the stopper 21. The locking plate 8*c* has a semicircular notch, which is configured to lock the plunger 23 moving in a direction perpendicular to the width direction of the locking plate 8*c*, thereby preventing the throttle trigger 8 from returning to the idling position.

Figure 7:
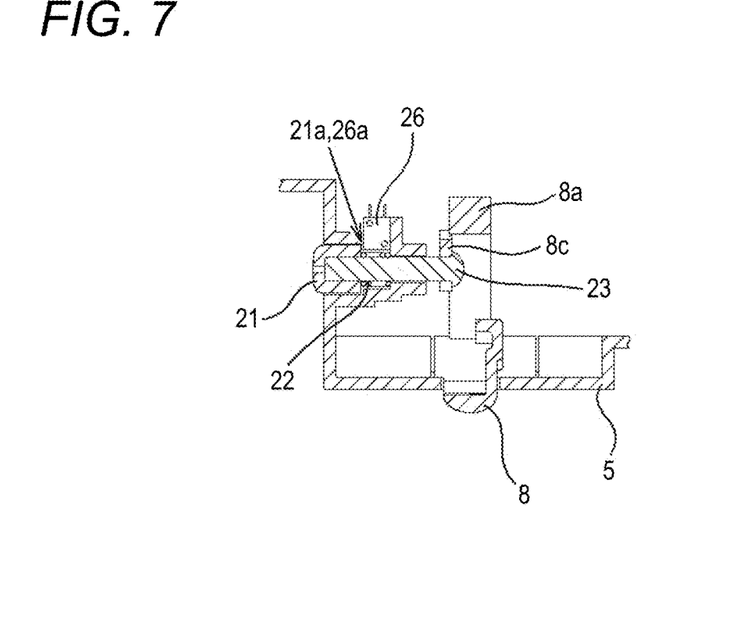
FIG. 7 is a partial cross-sectional view taken along the line A-A of FIG. 3 and shows the throttle trigger and the stopper when the throttle trigger is at the starting position.

FIG. 7 is a partial cross-sectional view taken along the line A-A of FIG. 3 and shows the throttle trigger 8 and the stopper 21 when the throttle trigger 8 is at the starting position. When the throttle trigger 8 is operated, and the stopper 21 biased by a spring 22 is pushed, the plunger 23 is locked by the locking plate 8*c* such that the throttle trigger 8 is held at the position (starting position) of FIG. 6. At this time, the tip portion 21*a* of the stopper 21 pushes the plunger 26*a* of the throttle-position detecting switch 26 such that the throttle-position detecting switch 26 becomes a connection state. Therefore, an ON signal is input to the ignition coil 16. In order to release the locking state of the stopper 21, it is only necessary to hold the throttle trigger 8 tighter than in the locking state. By doing so, the stopper 21 returns to the original position shown in FIG. 5 by the biasing of the spring 22, such that the locked state of the plunger 26*a* by the locking plate 8*c* is released. As a result, the throttle trigger 8 returns to the idling position.

Figure 10:
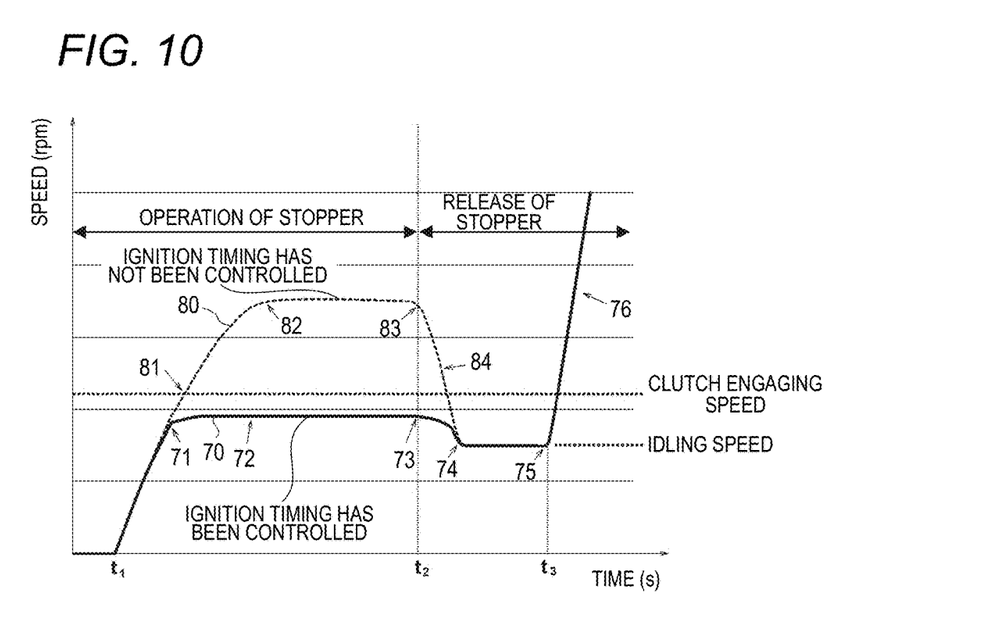
FIG. 10 is a view illustrating an ignition-timing control operation according to the embodiment of the present invention.

Now, a starting procedure of an engine 10 according to the related art will be described. FIG. 10 is a view illustrating a change in the speed from when the engine 10 according to the first embodiment of the present invention starts to when the engine 10 is usually used, and FIG. 10 also shows the speed of the engine 10 according to the related art by a dotted line for comparison. In starting the engine 10, the worker first holds the throttle trigger 8 to move the throttle trigger 8 in the direction of the arrow 51 of FIG. 4. After the throttle trigger 8 moves, the worker pushes the stopper 21 from the side. Then, the plunger 26*a* is locked by the locking plate 8*c*, such that the throttle trigger 8 is fixed at the starting position (in the half-throttled state). Next, the worker pulls the choke knob 36 in the direction of the arrow 54 of FIG. 4, and pulls a knob 9 of a starter, thereby performing an initial explosion. In general, during the initial explosion, the engine 10 stops. When confirming the sound of the explosion of the engine 10 when pulling the knob 9 for the first time, the worker returns the choke knob 36 to the original position, and pulls the knob 9 again. After the choke knob 36 returns, when the worker pulls the knob 9 one to several times, the engine 10 starts.

The engine speed 80 shown by the dotted line in FIG. 10 is the speed of the engine 10 during starting under the control according to the related art. After confirming the initial explosion, when the worker returns the choke knob 36 and pulls the knob 9 at a time $t_1$ again, the engine 10 starts. At this time, the throttle trigger 8 is at the starting position (in the half-throttled state). Therefore, the engine speed increases beyond a clutch engaging speed (at the clutch engaging speed or higher, the centrifugal clutch becomes the engaged state) shown by an arrow 81, up to a medium speed, as shown by an arrow 82, and stabilizes at the medium speed. In this state, generally, the centrifugal clutch 3 becomes the engaged state, and thus the rotary blade 6 rotates. After determining that the warm-up of the engine 10 has been completed, when the worker pulls the throttle trigger 8 at a time $t_2$ again and thereby releasing the stopper 21, the engine speed is reduced from a speed shown by an arrow 83 to a speed during idling as shown by an arrow 84. In such a related art, unless any measure such as a brake mechanism is taken, the rotary blade 6 may rotate during the starting and the warm-up when the stopper 21 is operated. However, it is not preferable that the rotary blade 6 rotates. For this reason, in the present embodiment, during the starting and the warm-up, the speed of the engine 10 is controlled such that the engine speed does not exceed the clutch engaging speed. Therefore, the rotary blade 6 is prevented from revolving during the starting and the warm-up.

Figure 8:
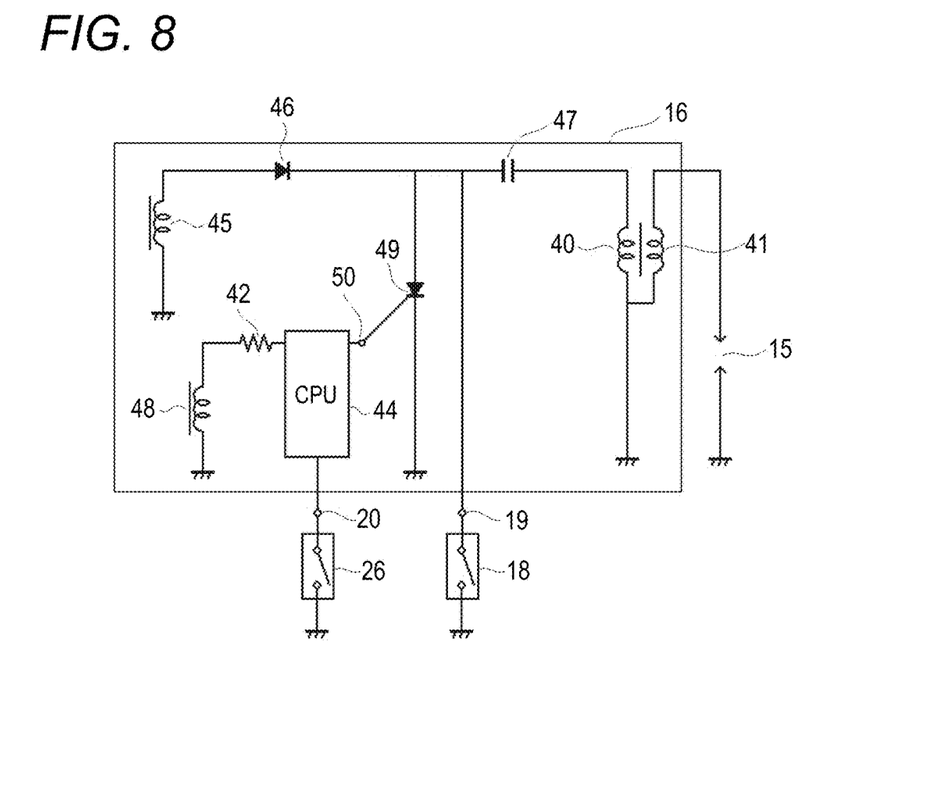
FIG. 8 is a diagram illustrating a control circuit of an ignition coil according to the embodiment of the present invention.

Next, a configuration of a control circuit of the ignition coil 16 according to the present embodiment will be described with reference to FIG. 8. In the control circuit diagram of FIG. 8, a control unit for controlling the ignition timing of the engine 10 is integrated into the ignition coil 16 for controlling the ignition of the spark plug 15. The control unit is composed of a CPU (engine-speed control unit) 44. This ignition coil 16 may also be called a digital ignition. The ignition coil 16 generates a high voltage on an exciter coil 45 by rotation of the magnet rotor 14 (see FIG. 3), and the generated electric charge is accumulated in a capacitor 47 through a diode 46. On the other hand, an ignition signal corresponding to the engine speed caused by a pulsar coil 48 is input to the CPU 44 through a resistor 42, and the CPU 44 supplies the ignition signal to a gate terminal 50 of a silicon controlled rectifier (SCR) 49, thereby discharging the charged capacitor 47. Incidentally, the ignition coil 16 also functions as an engine-speed detecting unit for detecting the ignition signal generated by the pulsar coil 48, as the engine speed. The electric discharge of the capacitor 47 causes a current to flow in a primary coil 40, and a high voltage is generated on a secondary coil 41, such that the spark plug 15 sparks.

The ignition coil 16 has the first terminal 19 and the second terminal 20. The first terminal 19 is connected to the stop switch 18, and when the stop switch 18 is turned on, the first terminal 19 is grounded. The second terminal 20 is connected to the throttle-position detecting switch 26 which is the throttle-opening detecting unit, and when the throttle-position detecting switch 26 is turned on, the second terminal 20 is grounded.

Figure 9:
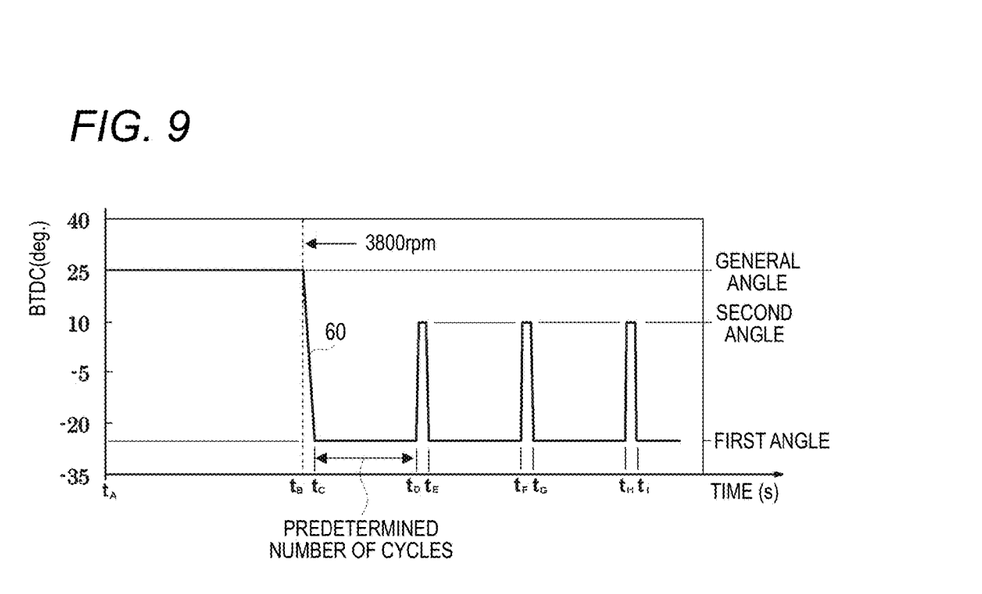
FIG. 9 is a view illustrating operation timings of ignition timing control according to the embodiment of the present invention.

Next, operation timings of ignition timing control according to the present embodiment will be described with reference to FIG. 9. In FIG. 9, the vertical axis represents how many degrees the ignition timing is before a top dead center (hereinafter, referred to as BTDC). For example, 25 degrees BTDC represents that a high-voltage current flows in the spark plug 15 at 25 degrees before a crank angle at which the piston of the engine 10 reaches the top dead center. The horizontal axis represents the elapsed time (in units of seconds). In a case where the throttle-position detecting switch 26 is OFF, that is, in a case were the throttle trigger 8 is not held at the starting position, the CPU 44 transmits the ignition signal to the gate terminal 50 of the SCR 49 such that the ignition timing becomes a general ignition angle, for example, 25 degrees BTDC as shown between a time $t_A$ to a time $t_B$ in FIG. 9. Therefore, in relation to an increase in the engine speed, ignition is performed at a predetermined ignition timing. Similarly, in addition to a case where the engine 10 rotates at the idling speed, the ignition timing of the engine 10 is controlled to 25 degrees BTDC when the worker pulls the throttle trigger 8 to perform cutting with the rotary blade 6.

On the other hand, in a case where the throttle-position detecting switch 26 is ON, that is, in a case where the throttle trigger 8 is held at the starting position, after the engine speed reaches a predetermined speed, for example, 3800 rpm, which is slightly lower than the speed when the centrifugal clutch 3 (see FIG. 2) becomes the engaged state, for example, 4300 rpm, at the time $t_B$, the ignition timing 60 is controlled such that the ignition timing is significantly retarded from the general ignition angle (for example, 25 degrees) to a first angle (for example, −25 degrees) BTDC, as shown at a time $t_C$ and is maintained at the first angle for a predetermined number of cycles (for example, 10 cycles). Further, at a time $t_D$, the CPU 44 transmits the ignition signal to the gate terminal 50 of the SCR 49 such that the ignition timing is advanced from −25 degrees to the second angle (for example, 10 degrees) BTDC and is maintained at the second angle for a predetermined number of cycles (for example, 1 cycle). Next, at a time $t_E$, the ignition timing is significantly retarded to −25 degrees BTDC again, and is maintained at −25 degrees BTDC for 10 cycles. Similarly, at a time $t_F$ or $t_H$, the ignition timing is advanced to 10 degrees and is maintained at 10 degrees for 1 cycle, and the same control is performed while the throttle-position detecting switch 26 is ON.

As described above, in the case where the throttle-position detecting switch 26 is ON, if the engine speed is 3800 rpm or more, the ignition timing is controlled such that the ignition timing is advanced from the first angle (−25 degrees) to the second angle (10 degrees) BTDC at predetermined intervals (for example, at intervals of 10 cycles) and is maintained at the second angle for the predetermined time period (for example, a time period corresponding to 1 cycle). Thereafter, the same control as shown from the time $t_C$ to a time $t_I$ is repeated until the throttle-position detecting switch 26 is turned off or the engine speed becomes 3800 rpm or less. Incidentally, the relation between the ignition timings is as follows. The first angle is sufficiently later than the general ignition angle, and the second angle is earlier than the first angle. It is preferable to set the second angle to be slightly later than the general ignition angle. Alternatively, the second angle may be set to be the same as the general ignition angle, or to be earlier than the general ignition angle.

In the present embodiment, during an operation where the ignition timing is the first angle, the ignition timing is advanced to the second angle at the predetermined intervals and is maintained at the second angle for the predetermined time period. The predetermined interval and the predetermined time period may be determined not only as cycles like 10 cycles and 1 cycle, respectively, but also as a time interval. In the present embodiment, the relation between the predetermined interval and the predetermined time period is fixed. However, the predetermined interval and the predetermined time period may be variable according to the state of the engine 10. For example, the ignition timing may change from the second angle to the first angle only one time from the 8th cycle to the 12th cycle.

As described above, in the case where the throttle-position detecting switch 26 is ON, if the engine speed is 3800 rpm or more, the ignition timing is controlled such that the ignition timing is advanced from the first angle (e.g., −25 degrees) to the second angle (e.g., 10 degrees) BTDC at the predetermined intervals (at intervals of a predetermined number of cycles). This state will be described with reference to FIG. 10. In the control according to the present embodiment, if the engine starts at the time $t_1$, the engine speed increases as shown by reference numeral 70. If the engine speed reaches a predetermined speed, for example, 3800 rpm at a point shown by an arrow 71, the ignition timing is controlled such that the ignition timing is retarded from the general angle (for example, 25 degrees) to the first angle BTDC. Thereafter, the ignition timing is controlled at the predetermined intervals such that the ignition timing becomes the second angle. If this control is performed, the engine speed is constantly maintained as shown by an arrow 72, without exceeding the clutch engaging speed (for example, 4300 rpm). As described above, according to the present embodiment, since the engine speed is maintained so as not to exceed the clutch engaging speed, after the engine starts, during the warm-up, it is possible to efficiently prevent the centrifugal clutch 3 from becoming the engaged state.

If the worker determines that the warm-up has been completed and holds and releases the throttle trigger 8 again at the time $t_2$ (the point shown by an arrow 73) so as to release the stopper 21, the throttle trigger 8 returns to a fully closed position, and the engine 10 is controlled at the general ignition angle. After the time $t_2$, the engine speed decreases up to the idling speed (about 3800 rpm) as shown by an arrow 74 and is maintained at the idling speed until the worker starts work at the time $t_3$. Incidentally, if the worker pulls the throttle trigger 8 at the time $t_3$, the engine speed increases at a time from a speed shown by an arrow 75 as shown by an arrow 76, so as to far exceed the clutch engaging speed. Therefore, the rotary blade 6 rotates, and cutting becomes possible.

According to the present embodiment, even in the case where the throttle trigger 8 is operated to be held at the starting position such that the amount of intake air increases in order to facilitate the starting of the engine 10 so as to start the engine, if the engine speed exceeds a predetermined speed lower than the speed when the centrifugal clutch 3 becomes the engaged state, the CPU 44 controls the ignition timing such that the ignition timing is retarded. As a result, the combustion in the cylinder 11 of the engine 10 is substantially prevented and the power output can be reduced. Therefore, it is possible to suppress an increase in the speed. Also, since the ignition timing is suppressed from −25 degrees to 10 degrees BTDC at intervals of the predetermined number of cycles, it is possible to prevent extreme retardation of the ignition timing from continuing, thereby preventing fouling on the spark plug 15. Therefore, in the case where the throttle trigger 8 is operated to be held at the starting position, it is possible to improve the startability, and to prevent the engine 10 from stopping due to fouling on the spark plug 15 while suppressing an increase in the engine speed during the starting. Further, since it is possible to suppress the engine speed from exceeding the speed when the centrifugal clutch 3 becomes the engaged state, it is also possible to suppress the rotary blade 6 of the cutter 1 from rotating during the starting.

Second Embodiment

Figure 11:
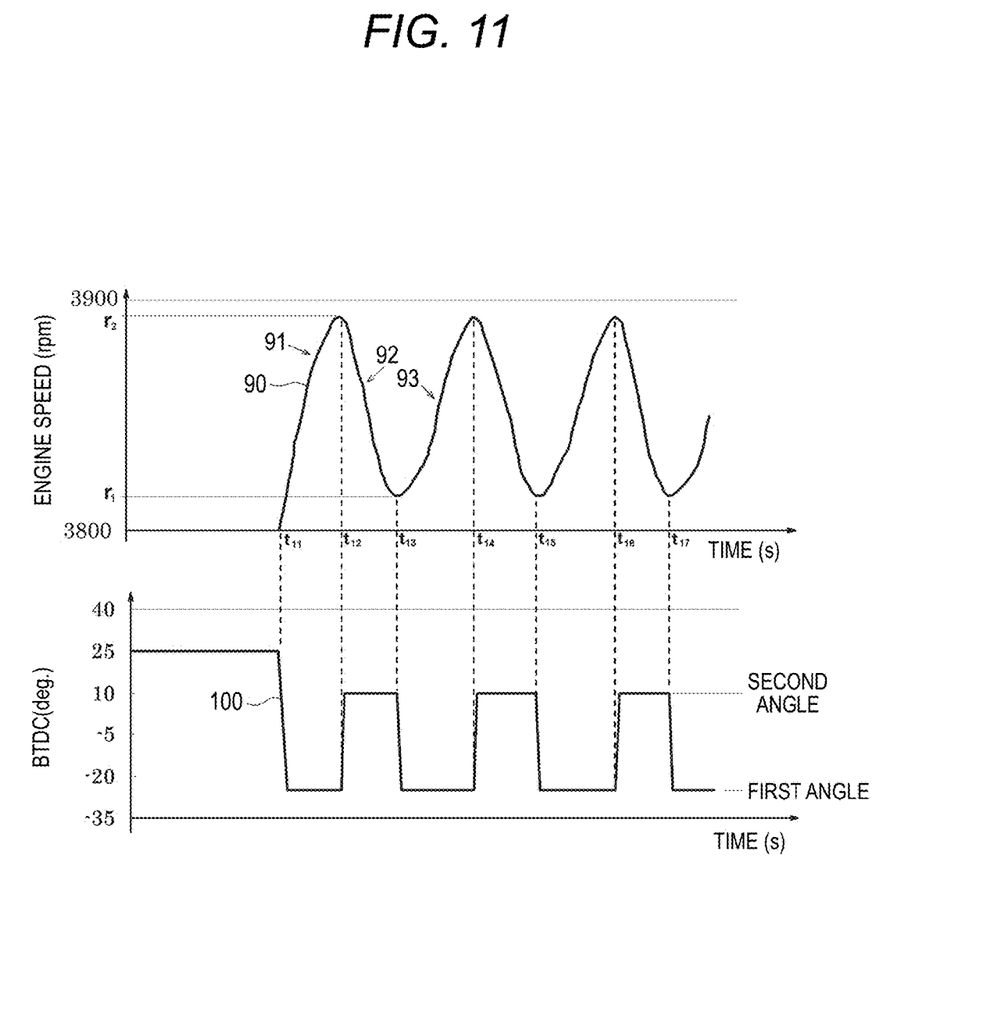
FIG. 11 is a view illustrating operation timings of ignition timing control according to a second embodiment of the present invention.

Next, operation timings of ignition timing control according to a second embodiment of the present invention will be described with reference to FIG. 11. In the second embodiment, in the case where the throttle-position detecting switch 26 is OFF, that is, in the case where the throttle trigger 8 is not held at the starting position, like in the ignition timing control according to the first embodiment, the CPU 44 transmits the ignition signal to the gate terminal 50 of the SCR 49 such that the ignition timing becomes, for example, 25 degrees BTDC, and ignition is performed at a predetermined ignition timing. On the other hand, in the case where the throttle-position detecting switch 26 is ON, that is, in the case where the throttle trigger 8 is held at the starting position, as shown in FIG. 11, if the engine speed exceeds a predetermined speed, for example, 3800 rpm, which is slightly lower than the speed when the centrifugal clutch 3 (see FIG. 2) becomes the engaged state, for example, 4300 rpm, the ignition timing is controlled such that the ignition timing is retarded from 25 degrees to −25 degrees BTDC, for example. In this case, if the engine speed exceeds a first speed $r_1$, the ignition timing is retarded from 25 degrees to −25 degrees BTDC, and if the engine speed exceeds a second speed $r_2$, the ignition timing is advanced from −25 degrees to −10 degrees BTDC.

Referring to the example of FIG. 11, at a time $t_{11}$, since the engine speed exceeds 3800 rpm, the ignition timing is retarded from 25 degrees to −25 degrees BTDC as shown by reference numeral 100. If the ignition timing is retarded as described above, although the increase of the engine speed 90 slows down as shown by an arrow 91, the engine speed 90 continue to increase. Next, if the speed exceeds the second speed $r_2$, the ignition signal is transmitted to the gate terminal 50 of the SCR 49 such that the ignition timing is advanced from −25 degrees to 10 degrees BTDC. Then, the engine speed 90 decreases as shown by an arrow 92. At an interval from a time $t_{12}$ to a time $t_{13}$, the engine speed 90 decreases, even though the ignition timing is advanced from −25 degrees to 10 degrees BTDC and is maintained at 10 degrees BTDC. This is because the influence of retardation in an interval from the time $t_{11}$ to a time $t_{12}$ is reflected to the engine speed 90 with a time lag. Similarly, at the time $t_{13}$, if the engine speed is lower than the first speed $r_1$, the ignition timing is retarded from 10 degrees to −25 degrees BTDC. This is because, if the ignition timing is 10 degrees BTDC at the time $t_{13}$, its influence may appear after the time $t_{13}$ and the engine speed 90 may rise with an inclination larger than an inclination shown by an arrow 93. As described above, in the present embodiment, in response to the increase or decrease state of the engine speed 90, control is performed such that the ignition timing 100 changes.

This retardation control on the ignition timing continues until the engine speed becomes lower than the predetermined speed, for example, 3800 rpm, or until the worker operates the throttle trigger 8 to release the stopper 21. In conjunction with the release of the stopper 21, the throttle-position detecting switch 26 is turned off. Therefore, the CPU 44 (see FIG. 8) detects that state and returns the ignition timing to the general angle.

According to the present invention, the engine-operated working machine includes the throttle-opening detecting unit and an engine-revolution control unit. The throttle-opening detecting unit detects operation of the throttle opening for increasing the amount of intake air to be supplied into the cylinder during the starting. When the throttle-opening detecting unit detects the throttle operation, the engine-revolution control unit retards the ignition timing to the first angle, and then retards the ignition timing to the second angle at the predetermined intervals, thereby suppressing the engine speed to the predetermined speed or less. Therefore, it is possible to improve the startability, and to prevent the engine from stopping due to fouling on the spark plug while suppressing an increase in the engine speed during the starting.

Although the present invention has been described on the basis of the embodiments, the present invention is not limited by the above-described embodiments, but may be variously changed without departing from the scope of the present invention. For example, although the cutter 1 using the present invention has been described in the above-described embodiments, the present invention can be similarly applied even to other engine-operated working machines such as bush cutters and chainsaws.

Also, in the above-described embodiments, the throttle-position detecting switch 26 is linked with the stopper 21. Alternatively, the throttle-position detecting switch 26 may be linked with the throttle trigger 8 or a throttle lever of a fast idling type carburetor having a mechanical linking mechanism between a choke value and a throttle valve. Further, in the above-described embodiments, the ignition coil 16 has two terminals. Alternatively, it is possible to increase the number of terminals when needed. Furthermore, it has been described that the ignition coil 16 is configured to detect the ignition signal generated by the pulsar coil 48 as the engine speed. Alternatively, the ignition coil 16 may detect noise from the exciter coil 45, instead of the pulsar coil 48, as the engine speed.

This application claims the benefit of Japanese Patent Application No. 2011-179903 filed on Aug. 19, 2011, the disclosure of which is incorporated herein in its entirety by reference.

INDUSTRIAL APPLICABILITY

As described above, an engine-operated working machine according to the invention has advantages of capable of preventing an engine from stopping due to fouling on a spark plug while suppressing an increase in the speed of the engine during starting. The invention is useful for the engine-operated working machine, for example.

REFERENCE SIGNS LIST

1 Cutter
2 Front handle
3 Centrifugal clutch
4 Arm
5 Rear handle
5a Opening
6 Rotary blade
7 Locking lever
8 Throttle trigger
8a Movable arm
8b Rotary shaft
8c Locking plate
8d Stopper
9 Knob
10 Engine
11 Cylinder
12 Housing
13 Crankshaft
14 Magnet rotor
15 Spark plug
16 Ignition coil
18 Stop switch
19 First terminal
20 Second terminal
21 Stopper
21a Tip end
22 Spring
23 Plunger
26 Throttle-position detecting switch
27 Muffler
30 Carburetor
31. Throttle lever
32 Throttle operating rod
33 Torsion spring
34 Choke lever
35 Choke operating rod
36 Choke knob
37 Belt
40 Primary coil
41 Secondary coil
42 Resistor
44 CPU
45 Exciter coil
46 Diode
47 Capacitor
48 Pulsar coil
49 SCR
50 Gate terminal
60 Ignition timing
70 to 90 Engine speed
100 Ignition timing

The invention claimed is:

1. An engine comprising:
a cylinder;
a carburetor configured to supply an air-fuel mixture into the cylinder and includes a throttle valve; and
an ignition device configured to ignite the air-fuel mixture in the cylinder, wherein:
the engine comprises:
an engine-speed detecting unit configured to detect the speed of the engine;
a throttle-opening detecting unit configured to detect a state that an opening of the throttle valve is held at a predetermined position for starting of the engine; and
a control unit configured to control the ignition timing of the ignition device; and
if the engine has exceeded a predetermined speed during a time while the throttle-opening detecting unit is detecting the state that the opening of the throttle valve is held at the predetermined position at a time of starting of the engine the control unit performs control such that:
the ignition timing is retarded from a general angle to a first angle;
the retarded ignition timing is intermittently advanced from the first angle to a second angle; and
the retarding to the first angle and the advancing to the second angle are repeated alternatively.

2. The engine according to claim 1, wherein a retardation amount of the second angle from the general angle is smaller than a retardation amount of the first angle from the general angle.

3. The engine according to claim 1, further comprising:
a centrifugal clutch,
wherein the predetermined speed is lower than a speed when the centrifugal clutch becomes an engaged state.

4. The engine according to claim 1, wherein in a case where the detection of the state at the time of starting of the engine by the throttle-opening detecting unit is released, the control unit releases the ignition timing control using the first and second angles.

5. The engine according to claim 1, wherein during the throttle-opening detecting unit detecting the state at the time of starting of the engine, if the engine-speed detecting unit detects that the speed is lower than the predetermined speed, the ignition timing control using the first and second angles is released.

6. The engine according to claim 1, further comprising:
a stopper configured to fix a throttle trigger such that the opening of the throttle valve can be maintained at the predetermined position at the time of starting of the engine.

7. The engine according to claim 6, wherein the throttle-opening detecting unit is a switch configured to detect whether the stopper has been operated.

8. An engine-operated working machine comprising:
the engine according to claim 1.

* * * * *